March 8, 1960 W. H. DEUBENER 2,927,580
RUPTURE GUARDS

Filed Sept. 11, 1957 2 Sheets-Sheet 1

INVENTOR
Walter H. Deubener

BY Robert M. Dunning

ATTORNEY

March 8, 1960     W. H. DEUBENER     2,927,580
RUPTURE GUARDS
Filed Sept. 11, 1957     2 Sheets-Sheet 2
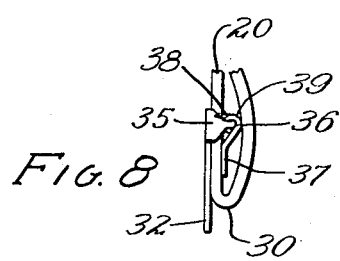
FIG. 8
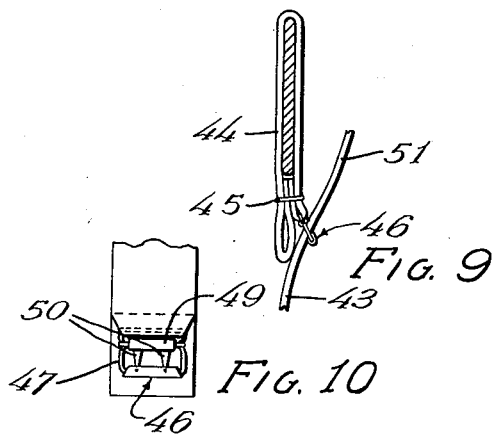
FIG. 9
FIG. 10
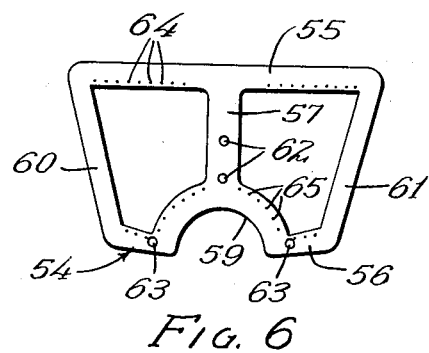
FIG. 6
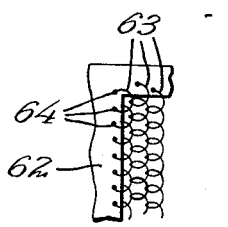
FIG. 7
INVENTOR
*Walter H. Deubener*
BY *Robert M. Dunning*
ATTORNEY

United States Patent Office 2,927,580
Patented Mar. 8, 1960

2,927,580

RUPTURE GUARDS

Walter H. Deubener, St. Paul, Minn.

Application September 11, 1957, Serial No. 683,329

11 Claims. (Cl. 128—119)

This invention relates to an improvement in rupture guards and deals particularly with an apparatus to reinforce the weakened areas.

Various types of appliances have been used to assist in the support of the body wall at the point or points where the rupture has occurred. Body encircling braces are often used for this purpose and are provided with pads which bear against the affected areas. Pads of this type are usually made of rubber or are covered with a leather covering and are accordingly ordinarily hot and uncomfortable, particularly in warm weather. It is an object of the present invention to provide a support designed to overlie the weakened areas and which is cool and comfortable to wear in any type of weather.

An object of the present invention resides in the provision of an open frame which supports a series of helical springs which are designed to overlie the weakened area. These metal springs may be arranged in closely spaced parallel relation or may be intertwined in the manner of a resilient wire mesh. These springs are supported by the frame to overlie the area where swelling normally occurs and the springs apply a gentle pressure against the affected portion of the body. As a result, the weakened area is very well supported and at the same time the springs may flex to fit the curvature of the body and to prevent an undue pressure upon the body.

A feature of the present invention resides in the fact that the springs permit a free passage of air through the body of the support. As a result, the pressure of the support against the body does not create a tendency for the area covered to become hot and irritated as the body heat is permitted to escape through the structure of the support.

A further feature of the present invention resides in the provision of a frame designed to overlie the weakened area of the body and which supports a resilient spring structure designed to reinforce the weakened area. A lining of porous fabric or other suitable material is supported by the frame inwardly of the springs and frame so as to hold the springs in spaced relation to the skin. This fabric is sufficiently porous to permit the free passage of air therethrough and to provide the desired ventilation.

A feature of the present invention resides in the fact that the frame is simple and light in construction and may comprise merely a pair of spaced transversely extending strips of metal or other suitable material centrally connected by a vertical connecting member which holds the cross members of the frame in properly spaced relation. The springs or spring mesh then extend in an upright direction from one frame member to the other. With this construction, the frame may flex to some extent to prevent undue pressure against the body. If preferred, the frame may also include side members connecting the ends of the cross members. While this frame is somewhat less flexible than the one first described, it is also somewhat stronger due to its construction.

A further feature of the present invention resides in the manner of supporting the rupture support in proper position upon the body. In preferred form, the support is held in place by a body encircling belt designed to extend about the body around the upper portions of the hips. Straps are connected to the rear portion of the body encircling belt and are designed to extend around a leg adjacent the crotch and are terminally connected to the lower portion of the frame on opposite sides of center thereof. Normally the body encircling belt is connected to the center portion of the frame intermediate the upper and lower edges thereof so that the lateral ends of the frame are free to flex and fit the curvature of the body.

These and other objects and novel features of the present invention will be more clearly and fully set forth in the following specification and claims.

In the drawings forming a part of the specification:

Figure 6 is a front elevational view of a modified type of frame, the springs and padding having been removed.

Figure 7 is an elevational view of a small portion of a modified form of construction showing spring mesh being used in place of helical springs which are separated as in the previous form of construction.

Figure 8 is a side elevation view of a portion of the strap structure.

Figure 9 is a cross sectional view through a portion of the body encircling belt, showing a means of adjustably connecting a strap thereto.

Figure 10 is a detail view of a portion of the supporting strap structure.

Figure 1:
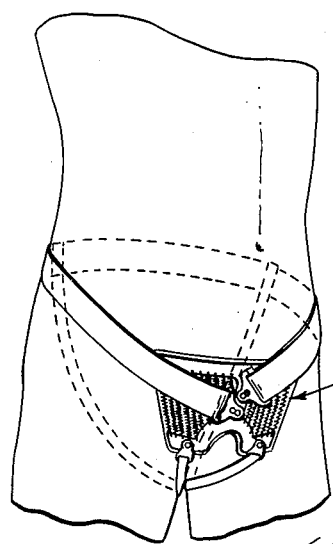
Figure 1 is a three quarter view of a portion of a human body showing the belt in position thereupon.
Figure 3:
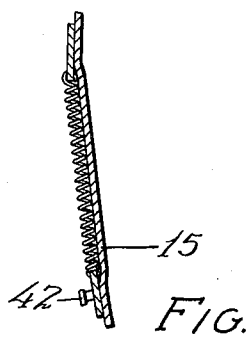
Figure 3 is a cross sectional view through the support, the position of the section being indicated by the line 3—3 of Figure 2.
Figure 2:
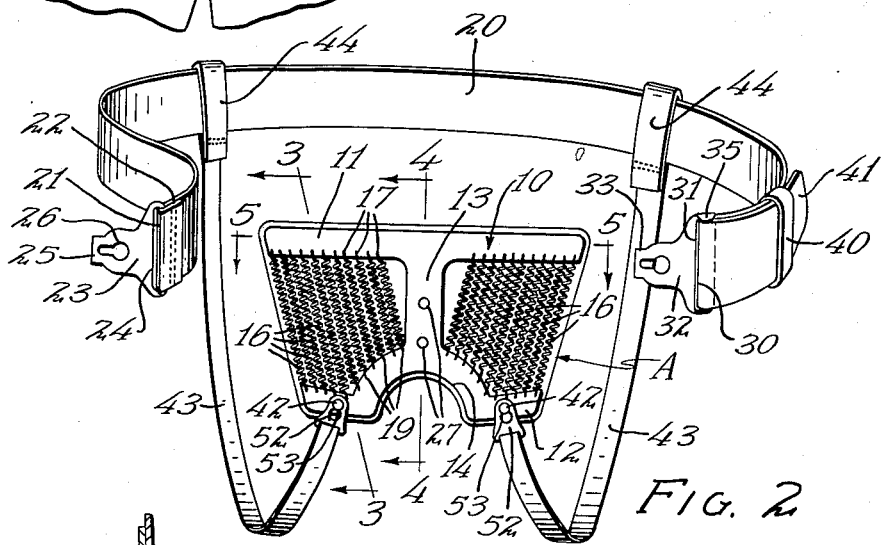
Figure 2 is a front perspective view of the rupture support with the ends of the body encircling belt detached to illustrate the construction of the support.

The rupture support is indicated in general by the letter A. In the preferred form of construction, the support includes a supporting frame which is indicated in general by the numeral 10. This frame 10 includes an upper cross member 11 and a lower cross member 12 which are connected by a central connecting strip 13. The lower cross member 12 is preferably centrally notched as indicated at 14 so that the sides of the pad may cover the areas of the body where ruptures most commonly occur.

As is indicated in the drawings, the forward surface of the frame 10 is somewhat convex so as to fit the curvature of the body. A fabric covering 15 overlies the inner or concave surface of the frame and extends between the ends of the cross members 11 and 12. This fabric lining is preferably formed of mesh cloth or similar material which is of considerable thickness and yet is extremely porous. The lining 15 may be secured to the frame 10 in any suitable manner and may be hemmed marginally to enclose the marginal edges of the frame or may be cemented or otherwise attached to the frame. The main purpose of the lining is to hold the frame and the spring structure supported thereby, which is usually formed of metal, in spaced relation to the skin.

A series of generally helical springs are secured in approximately parallel relation between the cross members 11 and 12. The upper ends of the springs 16 extend through apertures 17 in the upper cross member 11. The lower ends of the springs extend through apertures 19 in the lower cross member 12. The springs are preferably formed of different lengths and are stretched to provide a desired tension.

The frame 10 is supported by a body encircling belt 20 of webbing or other suitable material. One end of the belt 20 is folded at 21 and secured back upon itself by stitching such as 22 to support a metal fastener 23. The metal fastener 23 comprises a sheet of material which is slotted at 24 to accommodate the folded belt and which is provided with an ear 25 which projects at right angles to the slot 24. A key hole shaped aperture 26 is provided near the end of the ear 25 with the small dimension end of the slot adjoining the end of the ear.

Figure 4:
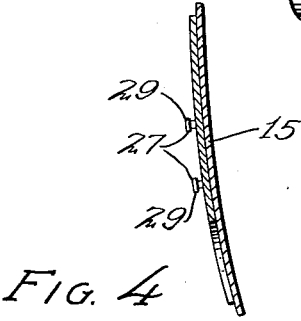
Figure 4 is a sectional view on the line 4—4 of Figure 2.
Figure 5:
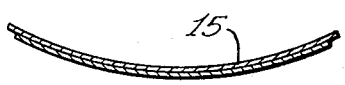
Figure 5 is a cross sectional view through the frame on the line 5—5 of Figure 2.

The connecting strip 13 of the frame 10 is provided with a pair of vertically spaced studs 27 projecting therefrom. As will be seen in Figure 4 of the drawings, the studs 27 are provided with enlarged diameter heads 29 which are spaced forwardly from the frame 10 and the studs are anchored to the frame in any suitable way such as by riveting. Either of the studs 27 is designed to accommodate the key hole shaped slot 26 to hold one end of the belt 20 connected to the frame 10.

The other end of the belt is doubled upon itself at 30 to extend through a slot 31 in a second fastening member 32. The fastening member 32 is provided with an ear 33 projecting at right angles to the slot 30 and provided with a key hole shaped slot 34 similar to the slot 26 and designed to accommodate either of the studs 27. The edges of the fastener 32 are provided with right angularly extending parallel ears 35 which terminate in opposed and aligned pivot projections 36 which extend parallel to the body of the fastener 32. A clamping plate 37, best shown in Figure 8 of the drawings is bent into channel-shaped form along one edge 39 and the edge 38 of the clamping plate is provided with teeth which are designed to extend into the belt 20. The ends of the channel shaped portion 39 are bent into cylindrical form to form bearings into which the projections 36 extend so as to pivotally support the clamping plates. When the clamping plate is in the position shown in Figure 8 of the drawings, the belt is held in adjusted relation to the fastener 32. A loop 40 is designed to encircle the belt 20 and the end 41 of the belt so as to hold the two parts in substantially surface contact.

The cross member 12 of the frame is also provided with a second pair of studs 42 which are arranged on opposite sides of the central notch 14. Relatively narrow straps 43 are folded upon themselves to form loops 44 which encircle the belt 20. The loops 44 are actually separate loops in preferred form as indicated in Figure 9 of the drawings, the ends of the loop being stitched together as indicated at 45 to support a buckle 46. The buckle 46 includes a wire loop 47 through which the strap 43 may extend. The buckle 46 also includes a pivoted prong support 49 which includes a pair of spaced prongs 50. With this arrangement, the end 51 of the belt 43 on either side of the belt 20 may extend through the buckle 46 and be adjustably connected.

The other ends of the belts 43 are secured to fasteners 52 which include key hole shaped slots 53 designed to accommodate the studs 42. Thus the straps 43 may be detachably connected to the frame 10 as well as the ends of the belt 20.

By connecting the body encircling belt to the center portion of the frame 10, the lateral edges of the support are free to flex to fit the form of the body and to form a proper support for the weakened area. The straps 43 tend to hold the support down in proper position and to overcome the tendency of the frame 10 to slide upwardly upon movement of the body.

In Figure 6 of the drawings I disclose a frame 54 which differs somewhat from the frame 10. The frame 54 includes an upper cross member 55 and a lower cross member 56 which are connected by a central connecting member 57. The lower cross member 56 is centrally notched as is indicated at 59 so that the sides of the frame may fit down over the weakened areas. The frame 54 differs from the frame 10 in that it includes frame sides 60 and 61 which connect the lateral ends of the cross members 55 and 56.

As in the previous frame, the central connecting member 57 is provided with a pair of projecting studs 62, and studs 63 also project from the cross member 56 on opposite sides of the notch 59. The upper cross member is provided with spaced apertures 64 to accommodate the upper ends of the springs while the cross member 56 is provided with similar apertures 65 to accommodate the lower end of the springs. The springs and the lining have been omitted to clarify the structure of the frame.

In Figure 7 of the drawings I disclose another slightly modified form of construction including a frame 62 which may be shaped either like the frame 10 or like the frame 54. The structure shown in 57 differs from the previous structure in that the coils 63 of the springs which are mounted in the frame are intertwined to form a resilient spring mesh. With this type of construction, the convolutions of the springs are normally spread farther apart to permit the intertwining action. The mesh is marginally connected by looping portions of the spring through apertures such as 64 in the frame 62. This type of construction has the advantage that the springs are connected laterally as well as longitudinally so that the pressure is spread over a wider area. The structure has the disadvantage of being somewhat harder to mount in its frame than the spaced springs of the previously described constructions.

In accordance with the patent statutes, I have described the principles of construction and operation of my improvement in rupture guards, and while I have endeavored to set forth the best embodiments thereof, I desire to have it understood that changes may be made within the scope of the following claims without departing from the spirit of my invention.

I claim:

1. A rupture support including a frame having an upper cross member, a lower cross member, and a connecting member holding said cross members in spaced relation, and a resilient spring wire structure secured extending between said cross members, and flexible body encircling means holding said frame to overlie the weakened area.

2. A rupture support for use in combination with a flexible body encircling member designed to hold the support in position over a weakened body area, the support including a frame having a pair of vertically spaced cross members, and a connecting member holding said cross members in spaced relationship, and a resilient wire spring structure supported connecting said cross members.

3. The construction described in claim 2 and in which said connecting member is positioned intermediate the ends of said cross member and in which said spring structure is arranged on opposite sides of said connecting member.

4. The construction described in claim 3 and in which the body encircling member is connected to said connecting member.

5. The construction described in claim 2 and in which said spring structure includes a series of individual helical springs terminally connected to said cross members.

6. The construction described in claim 2 and in which said spring structure comprises a resilient wire mesh.

7. The construction described in claim 2 and in which said connecting member is located intermediate the ends of said cross members, and including frame sides connecting the ends of said cross members.

8. A rupture support including a frame having an upper cross member, a lower cross member, and a connecting member holding said cross members in spaced relation, and a series of generally parallel helical springs connecting said cross members.

9. The structure of claim 8 and in which said helical springs are in slightly spaced relation.

10. The structure of claim 8 and in which said helical springs are intertwined to form a spring mesh.

11. A rupture support including a frame having an upper cross member, a lower cross member, and connecting members connecting the ends of said cross members, and a series of generally parallel helical springs connecting said cross members.

References Cited in the file of this patent
UNITED STATES PATENTS

| | | |
|---|---|---|
| 2,180,332 | Westphal | Nov. 14, 1939 |
| 2,226,509 | Foster | Dec. 24, 1940 |